Aug. 2, 1949.  P. D. BABCOCK  2,478,035
COMPOUND SWIVEL CASTER
Filed March 12, 1948
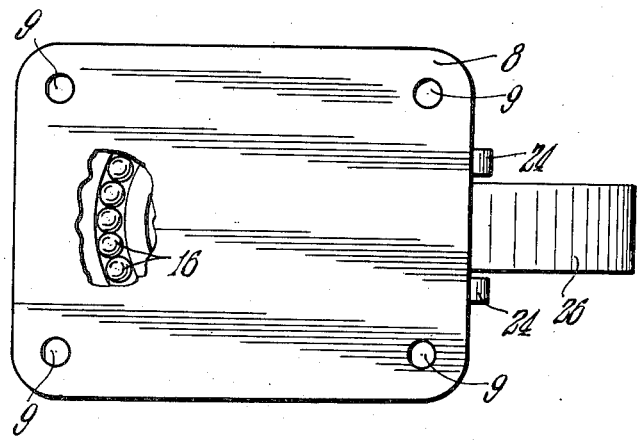
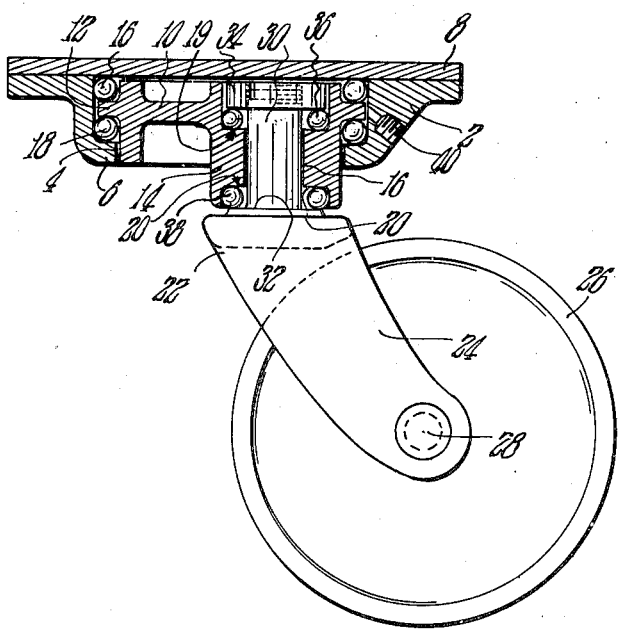
INVENTOR.
Pearl D. Babcock.
BY Ross & Ross
Attys.

Patented Aug. 2, 1949

2,478,035

UNITED STATES PATENT OFFICE 2,478,035

COMPOUND SWIVEL CASTER

Pearl D. Babcock, Warehouse Point, Conn., assignor to Geo. P. Clark Co., Windsor Locks, Conn., a corporation of Connecticut Application March 12, 1948, Serial No. 14,501

2 Claims. (Cl. 16—21)

This invention relates to improvements in a caster construction and has for its object the provision of a caster which is strong and durable and of special and novel form for efficient operation.

According to the invention a structure is provided which functions with a dual or compound swivel action thereby providing ease and efficiency in operation.

In a broad way the structure of the invention is characterized by a swivel plate which is rotatable in a housing and has a wheel carrying fork member rotatable therein on an axis eccentrically related to the axis of rotation of the swivel plate.

By reason of the novel construction with the caster construction supporting a vehicle such as a truck or the like the wheel operates with an efficient tracking action and swings readily as is desired.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is a plan view with a portion of the upper plate removed showing a caster construction embodying the novel features of the invention; and Fig. 2 is a side elevational view shown partially in section, of the caster construction shown in Fig. 1.

Referring now to the drawings more in detail, the invention will be fully described.

A housing is represented by 2 which has a central depression and an opening 4 in the lower wall 6 thereof all as shown.

An upper plate 8 is secured to the upper side of the housing 2 and this may be accomplished in one way such as by welding.

A swivel plate 10 is provided which has an outwardly extending annular flange 12 and a central hub 14.

Upper and lower series of balls 16 and 18 are disposed above and below the flange 12 whereby the member 10 is freely rotatable in the housing. The adjacent surfaces of the member 10 and depression of the member 2 are formed in such a manner that free rotation is provided without there being play which would result in binding and other objections.

The hub 14 is provided with an axial bore 16 and upper and lower ball seats 19 and 20 at opposite ends thereof and said hub and bore are disposed at a side of, or eccentrically relative to, the axis of rotation of the member 10 in the member 2.

A fork member 22 has lower spaced side portions 24 between which a wheel 26 is disposed that is rotatable on an axle 28 which may be of any desired form.

A stem 30 on the upper end of member 22 is threaded at its upper extremity as shown and has a ball seat 32 therebelow. A member 34 is in threaded engagement with the threaded portion of the stem, as shown.

A series of balls 36 is disposed between the member 34 and seat 19 and a similar series of balls 38 is disposed between the seats 20 and 32. In this way the fork member is mounted for free rotation in the member 10 and is held against objectionable axial movement therein.

Holes 9 are provided for securing the caster construction to a vehicle such as a truck and a threaded opening 40 is provided for a lubricant fitting of any desired form.

With the caster construction secured to a vehicle such as a truck or the like the wheel in supporting the load readily tracks as is desired.

In making a turn the tracking is largely accomplished by rotation of the member 10 in the housing and without appreciable rotation of the fork in the said member 10 until the latter portion of the turn when the fork quickly rotates. This is desirable inasmuch as tracking is accurate and particularly on turns the action is rapid.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A caster construction comprising in combination, a housing having a depression and a lower wall provided with an opening therethrough, a swivel plate in said opening having an outwardly extending annular flange, a plate secured to the upper side of said housing over said depression, a series of balls between said plate and flange and a series of balls between said flange and lower wall whereby said swivel plate is rotatable in said housing on a certain axis, said swivel plate provided with a bore on an axis eccentrically disposed relative to said certain axis, ball seats at opposite ends of said bore, a fork member having a part in said bore and ball seat means spaced outwardly from the opposite ends of said bore, and balls between said seat means and ball seats.

2. A caster construction comprising in combination, a housing having a circular depression provided with a lower wall which is disposed in a plane at right angles to the axis of the depression, said lower wall provided with an opening therethrough concentrically related to said depression, a swivel plate in said opening having an outwardly extending annular flange in said depression, a plate secured to the upper side of said housing over said depression, an upper series of balls between said plate and flange and a lower series of balls between said flange and lower wall whereby said swivel plate is rotatable in said housing on a certain axis, said swivel plate provided with a bore whose axis is parallel and eccentrically disposed relative to said certain axis, upper and lower ball seats at opposite ends of said bore, a lower fork member having an upper part extending upwardly through said bore and having a lower ball seat below the lower ball seat of the bore, a series of balls in the upper ball seat of the bore and a series of balls in the lower ball seat of said bore, an upper portion of the upper part of the fork member being screw threaded, and a member in threaded engagement therewith and in engagement with the series of balls in the upper ball seat of the bore.

PEARL D. BABCOCK.

REFERENCES CITED

The following references are of record in the file of this patent:

UNITED STATES PATENTS

| Number | Name | Date |
| --- | --- | --- |
| 1,589,104 | Bull | June 15, 1926 |
| 1,727,716 | Kassler et al. | Sept 10, 1929 |